Figure 1:
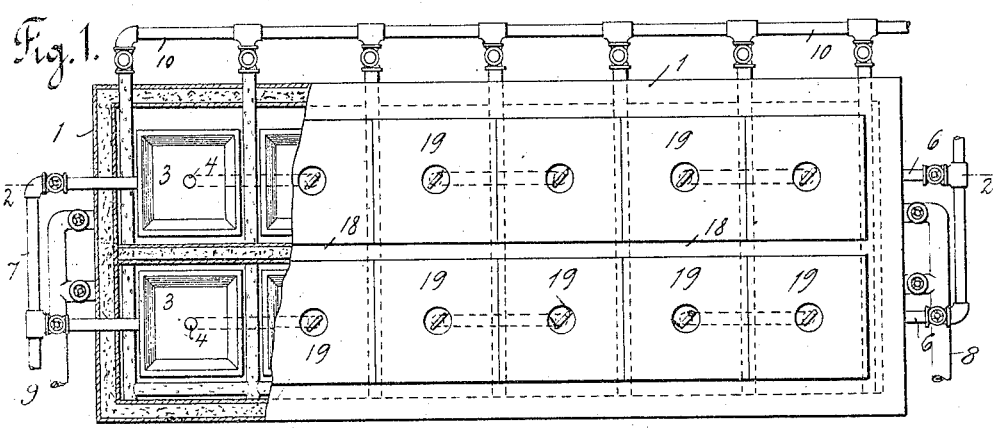

P. R. McCRARY.
PROCESS OF ICE MAKING.
APPLICATION FILED OCT. 3, 1904.

963,311.

Patented July 5, 1910.

Witnesses
Max B. A. Doring
James F. Duhamel

Pierce R. McCrary,
Inventor

By his Attorney E. A. O'Rosell

UNITED STATES PATENT OFFICE.

PIERCE R. McCRARY, OF PHILADELPHIA, PENNSYLVANIA.

PROCESS OF ICE-MAKING.

963,311.　Specification of Letters Patent.　Patented July 5, 1910.

Application filed October 3, 1904. Serial No. 227,057.

*To all whom it may concern:*

Be it known that I, PIERCE R. MCCRARY, a citizen of the United States, and resident of Philadelphia, in the county of Philadelphia and State of Pennsylvania, have invented certain new and useful Improvements in Processes of Ice-Making, of which the following is a specification.

This invention relates to a process of ice making and has in view the production of ice in stationary containers, abolishing the necessity of removing and replacing such containers.

It further has in view the production of transparent ice without distillation of the water used and without employment of stirrers in the ice containers, all as will more fully appear from the detailed description, the claims and the drawing in which—

Figure 2:
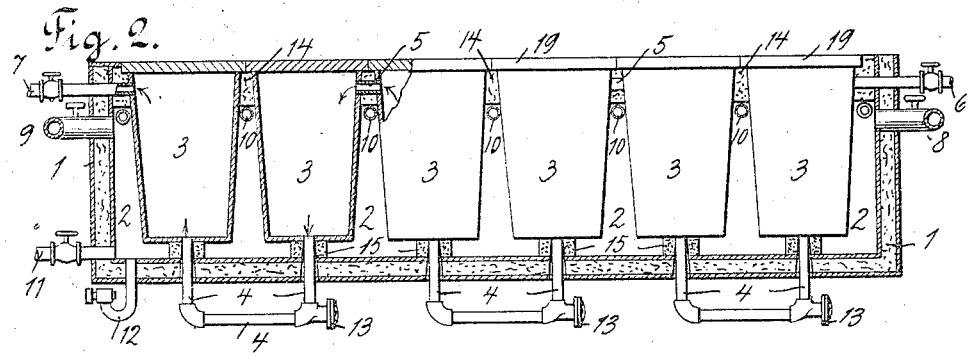
Figure 3:
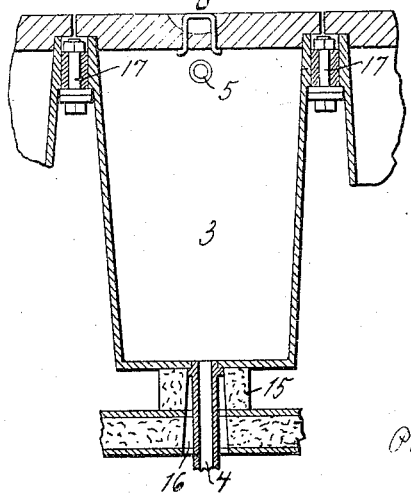

Figure 1 is a plan of an apparatus with which my process may be carried out. Fig. 2 a section on line 2—2 of Fig. 1. Fig. 3 is a detail view of a container.

In the figures 1 represents a water tank preferably supplied with an insulating packing. The lower portion of the tank 2 constitutes an air tight cooling compartment surrounding the ice cans or containers 3, 3, which containers communicate below through the pipes 4, 4 and above through openings in the sides, 5, 5.

6 is an inlet pipe for water and 7 is an outlet pipe for water.

8 is an inlet pipe for air and 9 is an outlet pipe for air.

10, 10 are spray pipes to spray solution of calcium-chlorid against the sides of the containers and 11 is an outlet pipe for the calcium chlorid solution.

12 is a drip pipe for moisture condensed from air used to thaw the ice formed in the containers 3, so as to become loose and rise to the top of the water covering it.

13 are diaphragms of rubber or other elastic material to allow an expansion of the water in the pipes after the ice in the containers has frozen solid, when no upward expansion is admitted.

14 represents insulating material such as cork, placed between the upper portions of the containers, and 15 represents like material surrounding the outlet pipes 4 at the bottom of the containers. The outlet pipes are still further protected against freezing by the air channel 16, (Fig. 3) between the pipes and the insulating material 15.

17 (Fig. 3) are rods from which the containers 3, 3 are suspended.

18 are partitions separating one compartment from another.

19 is a cover for an ice container.

The operation of the apparatus is as follows: Water is introduced through the pipe 6 until it overflows through the pipe 7. Cold air is then passed in through the pipe 8 and air is circulating out through the pipe 9 water circulating through the tank until the ice is frozen solid in some of the compartments when the circulation is stopped and the freezing is completed while the water in the tank is quiescent. Cold calcium chlorid solution is sprayed the same time the current of cold air is passed through the compartment 2. By the combined action of the spray of cold calcium chlorid solution and cold air, the period of freezing is very much shortened. The cold air may also be used alone without any spray. After the freezing, air above the freezing point is passed through the compartment 2, through the inlet pipe 8 and the outlet pipe 9. This air current is continued until the blocks of ice have thawed enough to become loosened and float on the top of the water in the tank. The insulating material 14 serves to prevent ice forming at the upper portion of the containers 3, and the insulating material 15 and the air channel 16 serve to prevent the water in the pipes 4 from freezing. After the freezing on the four sides of the container has proceeded so far that the faces of ice meet and unite, a current of water can no longer be passed through the containers 3. This closing of the ice block may serve as an automatic means for cutting off the current of water passing through the tank 1, or this current may be stopped arbitrarily when the freezing has proceeded to a certain point, for instance when ice blocks have reached a size about four fifths of the size of the finished blocks. After the faces of ice on the four sides have united the further formation of ice on the lower part of the block will cause an expansion, and this expansion was made to furnish increased room for the contained water. This is done by the elastic diaphragms 13.

This process involves a number of valuable features. In the first place the containers being stationary, the time and labor ordinarily required to remove and replace them is saved. In the second place, a volume of cold brine to surround the containers is dispensed with and the labor and time required to pump it is saved. The inconvenience and disadvantage of maintaining a large volume of liquid at a low temperature, which liquid constantly takes up heat from the adjacent atmosphere, is also avoided. In the third place the introduction of stirrers into the containers and their removal is dispensed with. In the fourth place the slow current of water through the series of tanks carries off enough air to prevent air bubbles to be inclosed in the ice, and in this way perfectly transparent ice is formed without the use of distilled water, a feature of the utmost importance. The fact that the water is allowed to remain quiescent during the last stage of the freezing is also a feature of value both as regards the transparency of the ice produced and also in economy. The process as a whole is the cheapest and most efficient for the production of transparent ice from non-distilled water.

What I claim as new is:

1. In the art of ice making the improvement which consists in confining volumes of water in a series of open receptacles, applying a refrigerating agent to the sides of the receptacles, until a portion of the water in each is frozen solid, causing a flow of water through all of the receptacles to be maintained during the initial period of the freezing, allowing a layer of water to remain above the block of ice formed and causing the frozen portions of the water to rise to the surface of the water.

2. In the art of ice making the improvement which consists in confining a volume of water in an open receptacle, applying a refrigerating agent to the lower portion of the receptacle so as to leave a layer of water above the ice formed, causing a flow of water to be maintained through the receptacle during a period of the freezing, then allowing the water to remain quiescent during the completion of the freezing and causing the frozen portion to rise to the surface of the water.

Signed at Philadelphia in the county of Philadelphia and State of Pennsylvania this 13th day of September A. D. 1904.

PIERCE R. McCRARY.

Witnesses:
C. A. O. ROSELL,
DAVID A. HAMMOND.